(12) United States Patent
Ikezoe

(10) Patent No.: US 7,353,894 B2
(45) Date of Patent: Apr. 8, 2008

(54) SEALED NICKEL-METAL HYDRIDE STORAGE CELLS AND HYBRID ELECTRIC HAVING THE STORAGE CELLS

(75) Inventor: Michinori Ikezoe, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 688 days.

(21) Appl. No.: 10/790,144

(22) Filed: Mar. 2, 2004

(65) Prior Publication Data
US 2004/0180256 A1   Sep. 16, 2004

(30) Foreign Application Priority Data
Mar. 10, 2003   (JP) .............................. 2003-063056

(51) Int. Cl.
*B60K 1/00* (2006.01)
(52) U.S. Cl. .................... 180/65.2; 180/65.8; 180/65.6; 903/908; 903/905
(58) Field of Classification Search ............. 180/65.1, 180/65.2, 65.3, 65.8, 65.6; 429/223, 206, 429/232, 9; 701/19, 22; 903/908, 905
See application file for complete search history.

(56) References Cited
U.S. PATENT DOCUMENTS

| | | | | |
|---|---|---|---|---|
| 6,158,537 A | * | 12/2000 | Nonobe ..................... | 180/65.3 |
| 6,166,934 A | * | 12/2000 | Kajouke et al. ............... | 363/65 |
| 6,255,008 B1 | * | 7/2001 | Iwase .............................. | 429/9 |
| 6,368,748 B1 | * | 4/2002 | Takee et al. ................. | 429/223 |
| 6,447,969 B1 | * | 9/2002 | Ito et al. ................... | 430/106.3 |
| 6,615,118 B2 | * | 9/2003 | Kumar ......................... | 701/19 |
| 6,920,948 B2 | * | 7/2005 | Sugiura et al. ............. | 180/65.2 |
| 2003/0129459 A1 | * | 7/2003 | Ovshinsky et al. ............ | 429/9 |

FOREIGN PATENT DOCUMENTS
JP    9-204931 A    8/1997

* cited by examiner

*Primary Examiner*—Hau Phan
(74) *Attorney, Agent, or Firm*—Foley & Lardner LLP

(57) ABSTRACT

A sealed nickel-metal hydride storage cell includes a positive electrode containing nickel as a positive electrode active material, a negative electrode containing a hydrogen-absorbing alloy as a negative electrode active material, a separator interposed between the positive electrode and the negative electrode and an electrolyte immersing therein the positive electrode and the negative electrode. The negative electrode has a theoretical capacity larger than a theoretical capacity of the positive electrode so as to provide a charge reserve capacity when the positive electrode is in a fully charged state and to provide a discharge reserve capacity when the positive electrode is in a fully discharged state. A ratio of the charge reserve capacity to the discharge reserve capacity ranges from 1:0 to 1:0.5.

10 Claims, 2 Drawing Sheets

SEALED NICKEL-METAL HYDRIDE STORAGE CELLS AND HYBRID ELECTRIC HAVING THE STORAGE CELLS

BACKGROUND OF THE INVENTION

The present invention relates to sealed nickel-metal hydride storage cells and a hybrid electric vehicle having the storage cells.

Japanese Laid-Open Patent Publication No. 9-204931 discloses a sealed nickel-metal hydride storage cell that has positive and negative electrodes containing nickel and hydrogen-absorbing alloy, respectively, as active materials. In order to avoid an increase in cell internal pressure and allow a reduction in cell size, weight and production cost, the quantity of electricity stored in the storage cell after the completion of charging is set smaller than the theoretical capacity of the positive electrode.

SUMMARY OF THE INVENTION

The above-mentioned storage cell is not however sufficient in capacity as the charge capacity of the storage cell is made smaller than its rating. The storage cell is thus susceptible to improvement in cost efficiency and energy density.

In view of the foregoing, it is an object of the present invention to provide a sealed nickel-metal hydride storage cell capable of attaining a high energy density at relatively low cost.

It is also an object of the present invention to provide a hybrid electric vehicle having such sealed nickel-metal hybrid storage cells.

According to a first aspect of the invention, there is provided a sealed nickel-metal hydride storage cell, comprising: a positive electrode containing nickel as a positive electrode active material; a negative electrode containing a hydrogen-absorbing alloy as a negative electrode active material, the negative electrode having a theoretical capacity larger than a theoretical capacity of the positive electrode so as to provide a charge reserve capacity when the positive electrode is in a fully charged state and to provide a discharge reserve capacity when the positive electrode is in a fully discharged state, a ratio of the charge reserve capacity to the discharge reserve capacity ranging from 1:0 to 1:0.5; a separator interposed between the positive electrode and the negative electrode; and an electrolyte immersing therein the positive electrode and the negative electrode.

According to a second aspect of the invention, there is provided a hybrid electric vehicle comprising a plurality of sealed nickel-metal hydride storage cells, each of the storage cells having: a positive electrode containing nickel as a positive electrode active material; a negative electrode containing a hydrogen-absorbing alloy as a negative electrode active material, the negative electrode having a theoretical capacity larger than a theoretical capacity of the positive electrode so as to provide a charge reserve capacity when the positive electrode is in a fully charged state and to provide a discharge reserve capacity when the positive electrode is in a fully discharged state, a ratio of the charge reserve capacity to the discharge reserve capacity ranging from 1:0 to 1:0.5; a separator interposed between the positive electrode and the negative electrode; and an electrolyte immersing therein the positive electrode and the negative electrode.

According to a third aspect of the invention, there is provided a hybrid electric vehicle, comprising: an internal combustion engine; a battery module having a plurality of nickel-metal hydride storage cells, each of the storage cells having positive and negative electrodes containing nickel and hydrogen-absorbing alloy, respectively, as electrochemically active materials, a separator disposed between the positive and negative electrodes and an electrolyte immersing therein the positive and negative electrode, the negative electrode having a theoretical capacity larger than a theoretical capacity of the positive electrode so as to provide a charge reserve capacity when the positive electrode is in a fully charged state and to provide a discharge reserve capacity when the positive electrode is in a fully discharged state, the discharge reserve capacity being smaller than charge reserve capacity; a generator driven by the engine to recharge the storage cells; means for detecting states of charge of the respective storage cells; and means for controlling the engine and the generator to keep an average of the states of charge of the storage cells at a given value or higher.

The other objects and features of the invention will also become understood from the following description.

DESCRIPTION OF THE EMBODIMENTS

The present invention will be described in detail with reference to FIGS. 1 and 2.

According to one exemplary embodiment of the present invention, hybrid electric vehicle (HEV) 10 has battery module 17 provided with a plurality of sealed nickel-metal hydride storage cells 1.

Each storage cell 1 includes at least one positive electrode, at least one negative electrode, at least one separator, an electrolyte and an electrolysis vessel. In the present embodiment, ten positive electrodes, eleven negative electrodes and twenty separators are provided. The positive electrodes and the negative electrodes are alternately arranged in the electrolysis vessel with each separator interposed between two adjacent electrodes. The electrolyte is sealed into the electrolysis vessel so that the positive electrodes and the negative electrodes are immersed in the electrolyte.

The positive electrode of storage cell 1 is not particularly restricted as long as the positive electrode contains nickel as a positive electrode active material. For example, the positive electrode may be provided by mixing 75% by weight of nickel hydroxide with 25% by weight of an aqueous solution of methylcellulose (as a viscosity improver), filling the resultant paste into a foamed nickel substrate (550 g/m$^2$), drying the paste-filled substrate at 70 to 80° C., roll-pressing the dried substrate and then cutting the roll-pressed substrate to a size of 20 mm×50 mm with the use of a slitter.

Likewise, the negative electrode of storage cell 1 is not particularly restricted as long as the negative electrode contains a hydrogen-absorbing alloy as a negative electrode active material. For example, the negative electrode may be provided by powdering a hydrogen-absorbing alloy (predominantly composed of misch metal) to a size of 100 mesh or smaller, mixing 75% by weight of the hydrogen-absorbing alloy powder with 25% by weight of an aqueous solution of polyvinyl alcohol (as a viscosity improver), applying a coat of the resultant paste to a nickel-plated punching metal substrate in such a manner that the coat has a thickness of 0.5 mm, drying the coated substrate at 70 to 80° C., roll-pressing the dried substrate and then cutting the roll-pressed substrate to a size of 19 mm×49 mm with the use of a slitter.

The separator of storage cell 1 can be made of a sulfonated polypropylene nonwoven fabric.

The electrolyte of storage cell 1 can be a 6-N aqueous solution of potassium hydroxide.

The electrolysis vessel of storage cell 1 can be made of a resin and formed into a rectangular shape.

Figure 1:
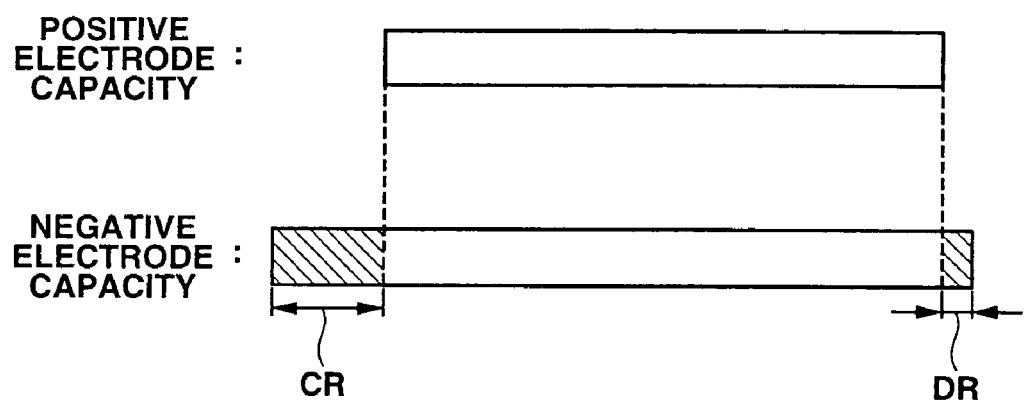
FIG. 1 is a schematic view showing the relationship between the positive and negative electrode capacities of a sealed nickel-metal hydride storage cell according to one exemplary embodiment of the present invention.

As shown in FIG. 1, the theoretical capacity of the negative electrode is made larger than the theoretical capacity of the positive electrode. The theoretical capacity of the electrode is herein defined as a capacity based on the total quantity of the active material contained in the electrode. When the positive electrode is in a fully charged state, the negative electrode contains a residual quantity of uncharged active material so as to provide a charge reserve capacity CR (i.e. an excess number of ampere-hours that can be further stored in the negative electrode). When the positive electrode is in a fully discharged state, the negative electrode contains a residual quantity of charged active material so as to provide a discharge reserve capacity DR (i.e. an excess number of ampere-hours that can be further withdrawn from the negative electrode).

Namely, storage cell 1 is classified as a so-called "positive-electrode-regulated type" in which the negative electrode capacity is larger than the positive electrode capacity. The fully charged state of such a positive-electrode-regulated type storage cell 1 is generally judged from the voltage or temperature rise rate of storage cell 1. However, the voltage of storage cell 1 becomes lowered or remains constant after storage cell 1 reaches a fully charged state. The fully charged state of storage cell 1 cannot be detected from the cell voltage accurately due to such unstable voltage characteristics, thereby often resulting in overcharging. Further, it is difficult to determine the temperature rise rate of storage cell 1 precisely under the influence of an ambient temperature. The fully charged state of storage cell 1 cannot be detected from the cell temperature rise rate accurately, thereby also resulting in overcharging. On the other hand, the fully discharged state of storage cell 1 is generally judged from the voltage of storage cell 1. As the degree of variations in the voltage of storage cell 1 is uniquely defined against the discharge capacity, the fully discharged state of storage cell 1 can be detected relatively accurately. The overdischarging of storage cell 1 does not occur so often. Based on the above facts, the frequency of overdischarging is considered much lower than the frequency of overcharging. By the application of storage cell 1 to HEV 10, it becomes thus possible to perform charge and discharge control under which storage cell 1 has a greater probability of being charged.

The above-structured nickel-metal hydride storage cell 1 is charged by the following electrochemical reactions (1) and (2):

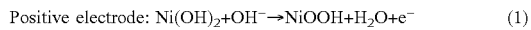

Positive electrode: $Ni(OH)_2 + OH^- \rightarrow NiOOH + H_2O + e^-$ (1)

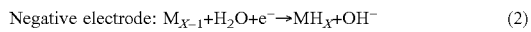

Negative electrode: $M_{X-1} + H_2O + e^- \rightarrow MH_X + OH^-$ (2)

where M represents a hydrogen-absorbing alloy and MH represents a metal hydride thereof.

At the end of charging, oxygen becomes evolved in the positive electrode by the following reaction (3). The evolved oxygen is recombined with hydrogen in the negative electrode by the following reaction (4) so that the internal pressure of storage cell 1 is prevented from increasing due to the generation of oxygen gas.

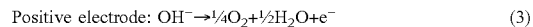

Positive electrode: $OH^- \rightarrow \frac{1}{4}O_2 + \frac{1}{2}H_2O + e^-$ (3)

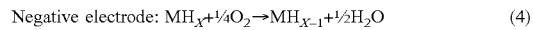

Negative electrode: $MH_X + \frac{1}{4}O_2 \rightarrow MH_{X-1} + \frac{1}{2}H_2O$ (4)

$M_X + \frac{1}{2}H_2 \rightarrow MH_{X+1}$ (5)

Further, the tendency of the hydrogen-absorbing alloy of the negative electrode to absorb hydrogen decreases with increase in charge current. At the end of charging, hydrogen is recombined with the hydrogen-absorbing alloy of the charge reserve capacity CR by the above reaction (5) so that the internal pressure of storage cell 1 is prevented from increasing due to the generation of hydrogen gas.

By these reactions (2), (4) and (5), storage cell 1 is kept in equilibrium to maintain the sealing of storage cell 1.

Although the negative electrode of storage cell 1 is generally lower in discharge efficiency and shorter in cycle life than the positive electrode of storage cell 1, the discharge reserve capacity DR compensates for such unfavorable negative electrode characteristics so as to maintain the performance of storage cell 1 without having to increase the capacity of the positive electrode. Herein, the negative electrode active material of the charge reserve capacity CR that has absorbed hydrogen in the reaction (5) is no longer used in the charge and discharge cycle of storage cell 1, but contributes to the discharge reserve capacity DR.

Considering that the frequency of overdischarging is lower than the frequency of overcharging due to the ease of detection of the fully discharged state of storage cell 1, the discharge reserve capacity DR is made smaller than the charge reserve capacity CR in the present embodiment. The ratio of the charge reserve capacity CR to the discharge reserve capacity DR is desirably controlled to (CR:DR)= (1.0:0) to (1.0:0.5). By setting the discharge reserve capacity DR smaller than the charge reserve capacity CR as specified above, it becomes possible to reduce the quantity of high-priced hydrogen-absorbing alloy used in the negative electrode and thereby reduce the size, weight and production cost of storage cell 1. It becomes also possible to allow storage cell 1 to attain a high energy density due to its reduced weight.

In the event that storage cell 1 becomes overcharged, the discharge reserve capacity DR may not be enough. In such a case, however, the discharger reserve capacity DR is complemented with a part of the charge reserve capacity CR corresponding to the negative electrode active material that has absorbed hydrogen by the above reaction (5), thereby avoiding the shortage of the discharge reserve capacity DR. Storage cell 1 is thus able to maintain its performance and increase in service life.

The charge and discharge reserve capacities CR and DR can be formed in the negative electrode as follows. In the manufacturing of the negative electrode, an excessive amount of hydrogen-absorbing alloy is added to form the charge reserve capacity CR. To form the discharge reserve capacity DR, a metal (e.g. divalent cobalt) having a redox potential lower than that of nickel is added. An appropriate amount of electricity is fed to the negative electrode during initial charge. Then, the added metal becomes oxidized to a hydride thereof as the discharge reserve capacity DR in preference to the oxidation of nickel in the positive electrode.

By way of example, nickel-hydride metal storage cell 1 of the present embodiment is formed with a nominal capacity of 7 Ah, a theoretical capacity ratio (the theoretical negative electrode capacity [Ah]/the theoretical positive electrode capacity [Ah]) of 1.3 and a reserve capacity ratio (the charge reserve capacity CR [Ah]/the discharge reserve capacity DR [Ah]) of 10.

Figure 2:
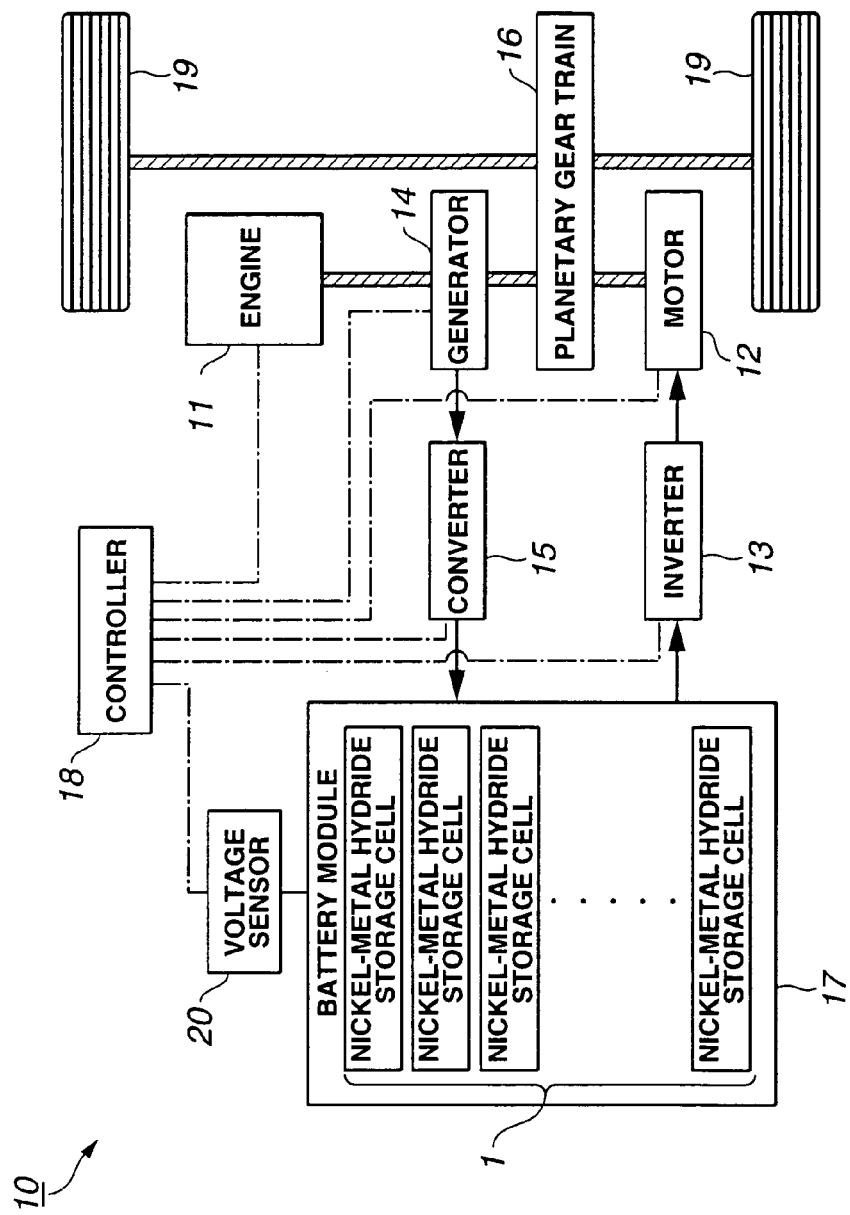
FIG. 2 is a schematic view of a hybrid electric vehicle provided with a plurality of sealed nickel-metal hydride storage cells according to one exemplary embodiment of the present invention.

As shown in FIG. 2, HEV 10 has engine 11 and motor 12 to drive vehicle wheels 19 through planetary gear train 16, battery module 17 to supply electricity to motor 12 through inverter 13, generator 14 linked to engine 1 to generate electricity for recharging battery module 17 through converter 15 and controller 18 to control the operations of engine 11, motor 12, inverter 13, converter 15 and generator 14. HEV 10 is designed as a so-called "parallel hybrid electric vehicle (PHEV)" that operates both of engine 11 and motor 12 simultaneously or either one of engine 11 and motor 12 solely to generate a driving power.

Engine 11 can be an internal combustion engine (such as a gasoline engine or a diesel engine).

Motor 12 can be an alternating current (AC) motor, an induction motor, a synchronous motor or a direct current (DC) motor. In the case of motor 12 being a DC motor, inverter 13 is replaced with a DC-DC converter.

Generator 14 can be a three-phase alternating current generator that generates a three-phase alternating current, and converter 15 converts the three-phase alternating current into a direct current. Alternatively, generator 14 may be a direct current generator. In this case, converter 15 is not needed.

Battery module 17 has nickel-metal hydride storage cells 1 connected electrically in series. The terminal voltage of each storage cell 1 is detected by voltage sensor 20 and outputted to controller 18.

Controller 18 determines the states of charge (SOC) of storage cells 1 based on the terminal voltages of storage cells 1, calculates the average value of the state of charge of storage cells 1 and checks whether the calculated average value is 55% or higher. When the calculated average value is lower than 55%, controller 18 operates engine 11 and generator 14 in such a manner that engine 11 drives generator 14 to generate electricity and thereby recharge battery module 17. Under the control of controller 18, the average value of the charge states of storage cells 1 is kept at 55% or higher all the time. The calculation method of the state of charge of each storage cell 1 is not limited to the above. For example, a temperature sensor or current sensor may alternatively be provided to each storage cell 1 so as to calculate the state of charge of storage cell 1 from the temperature or current of storage cell 1. When the average value of the states of charge of storage cells 1 is kept at 55% or higher all the time, storage cells 1 have a greater probability of being charged. The overdischarging of storage cells 1 can be thus avoided successfully. This makes it possible to make effective use of storage cells 1, in which the discharge reserve capacity DR is set smaller than the charge reserve capacity CR, in battery module 17 of HEV 10 without deterioration in cell performance and service life.

Furthermore, controller 18 checks whether the voltage of each storage cell 1 is higher than or equal to a discharge voltage limit. In the present embodiment, the discharge voltage limit is set at 1.15 V/cell. When the voltage of any storage cell 1 is lower than the discharge voltage limit, controller 18 operates engine 11 and generator 14 in such a manner that engine 11 drives generator 14 to generate electricity and thereby recharge battery module 17. Under the control of controller 18, the voltages of storage cells 1 are kept at the discharge voltage limit or higher all the time. As the discharge voltage limit provides an adequate voltage margin against a full discharge voltage, the overdischarging of storage cells 1 can be avoided more assuredly. This makes it possible to make effective use of storage cells 1 properly in battery module 17 of HEV 10 without deterioration in cell performance and service life.

Desirably, storage cells 1 are kept in substantially equal overcharged states during initial charge (e.g. during factory shipment or delivery). The equalization of the states of charge of storage cells 1 during initial charge can be performed by overcharging storage cells 1 to substantially the same state, and then, applying trickle charge to storage cells 1. Controller 18 may have the function of approximately equalizing the states of charge of storage cells 1 by e.g. controlling the application of trickle charge during initial charge. By such charge equalizing of storage cells 1, it becomes thus possible to prevent storage cells 1 from varying in initial charge capacity due to their self-discharge during the time from the completion of battery module 17 until the delivery of HEV 10 to a user and thereby possible to bring out the performance of storage cells 1 properly from the beginning of service of storage cells 1. In addition, the overcharge of storage cells 1 at the initial charging converts a part of the charge reserve capacity CR into the discharge reserve capacity DR in advance so as to prevent the shortage of the discharge reserve DR in the event of overdischarging and to avoid deterioration in cell performance and service life.

The entire contents of Japanese Patent Application No. 2003-063056 (filed on Mar. 10, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A hybrid electric vehicle comprising:
   an internal combustion engine;
   a plurality of sealed nickel-metal hydride storage cells, each of the storage cells comprising:
   a positive electrode comprising nickel as a positive electrode active material;
   a negative electrode comprising a hydrogen-absorbing alloy as a negative electrode active material, the negative electrode having a theoretical capacity larger than a theoretical capacity of the positive electrode so as to provide a charge reserve capacity when the positive electrode is in a fully charged state and to provide a discharge reserve capacity when the positive electrode is in a fully discharged state, a ratio of the charge reserve capacity to the discharge reserve capacity ranging from 1:0 to 1:0.5;
   a separator interposed between the positive electrode and the negative electrode; and
   an electrolyte immersing therein the positive electrode and the negative electrode;
   a generator driven by the engine to generate electricity for charging the storage cells; and
   a controller that controls the engine and the generator to recharge the storage cells.

2. A hybrid electric vehicle according to claim 1, further comprising a charge state detecting unit that detects states of charge of the respective storage cells, wherein the controller controls the engine and the generator in such a manner as to keep an average value of the states of charge of the storage cells at 55% or higher.

3. A hybrid electric vehicle according to claim 1, further comprising a voltage sensor to detect terminal voltages of the respective storage cells, wherein the controller controls the engine and the generator in such a manner as to keep the terminal voltages of the storage cells at 1.15 V or larger.

4. A hybrid electric vehicle according to claim 1, wherein the storage cells are overcharged to substantially equal states during initial charge.

5. A hybrid electric vehicle, comprising:
an internal combustion engine;
a battery module comprising a plurality of nickel-metal hydride storage cells, each of the storage cells comprising positive and negative electrodes comprising nickel and hydrogen-absorbing alloy, respectively, as electrochemically active materials, a separator disposed between the positive and negative electrodes and an electrolyte immersing therein the positive and negative electrode, the negative electrode having a theoretical capacity larger than a theoretical capacity of the positive electrode so as to provide a charge reserve capacity when the positive electrode is in a fully charged state and to provide a discharge reserve capacity when the positive electrode is in a fully discharged state, the discharge reserve capacity being smaller than charge reserve capacity;
a generator driven by the engine to recharge the storage cells;
means for detecting states of charge of the respective storage cells; and
means for controlling the engine and the generator to keep an average of the states of charge of the storage cells at a given value or higher.

6. A hybrid electric vehicle according to claim 5, wherein the given value is 55%.

7. A hybrid electric vehicle according to claim 5, further comprising means for detecting voltages of the respective storage cells, wherein the controller controls the engine and the generator to keep the voltages of the respective storage cells at a discharge voltage limit or higher.

8. A hybrid electric vehicle according to claim 7, wherein the discharge voltage limit is 1.15 V.

9. A hybrid electric vehicle according to claim 5, wherein the storage cells are overcharged during initial charge.

10. A hybrid electric vehicle according to claim 9, further comprising means for approximately equalizing the states of charge of the storage cells during initial charge.

* * * * *